(12) United States Patent
Hatano (10) Patent No.: US 7,710,474 B2
(45) Date of Patent: May 4, 2010

(54) LUMINANCE SIGNAL PROCESSING DEVICE

(75) Inventor: Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 1030 days.

(21) Appl. No.: 11/430,162

(22) Filed: May 9, 2006

(65) Prior Publication Data

US 2006/0256217 A1 Nov. 16, 2006

(30) Foreign Application Priority Data

May 10, 2005 (JP) ............................. 2005-137648

(51) Int. Cl.
*H04N 5/208* (2006.01)
(52) U.S. Cl. ...................... 348/252; 348/222.1; 348/234
(58) Field of Classification Search .............. 348/222.1, 348/234, 252, 253
See application file for complete search history.

(56) References Cited

U.S. PATENT DOCUMENTS 5,737,017 A 4/1998 Udagawa et al.

FOREIGN PATENT DOCUMENTS

JP 2001-189944 7/2001

*Primary Examiner*—Gevell Selby
(74) *Attorney, Agent, or Firm*—McDermott Will & Emery LLP (57) ABSTRACT

A filter section performs color carrier component removal and high-frequency level correction according to color image signal data, and a correction section performs edge enhancement correction. By these operations, luminance signal data is obtained. The characteristics of the filter section are established adaptively in accordance with the luminance signal level of low spatial frequency components in the color image signal data, the luminance signal edge level in the color image signal data, whether or not a predetermined color is exhibited in the color image signal data, a color difference edge level in the color image signal data, or whether or not the RGB data reaches the saturation level in the color image signal data.

8 Claims, 8 Drawing Sheets

Vertical-direction color carrier removing/
high-frequency level correcting filter

LUMINANCE SIGNAL PROCESSING DEVICE

BACKGROUND OF THE INVENTION

1. Field of the Invention

The present invention relates to a luminance signal processing device such as an image signal processing device, e.g., capable of attaining a high-definition image by obtaining a wideband digital luminance signal from an image signal output from an image sensor developed for use in digital cameras.

2. Description of the Related Art

In the camera industry, there has been a remarkable shift from analog to digital technology in recent years. In particular, digital still cameras, which do not require any films and development, are selling very well, and as for mobile phones, those with a camera are the mainstream.

At present, in the field of digital cameras, for example, the mainstream cameras adopt a sensor that places emphasis on color reproducibility and is thus equipped with a primary color filter, and signal processing associated with the sensor. Such a camera needs digital signal processing that places importance on resolution and provides excellent color S/N. In view of this, an imaging device and the like, in which noise can be removed while resolution decrease is suppressed, have been proposed (see, e.g., Japanese Laid-Open Publication No. 2001-189944).

Figure 9:
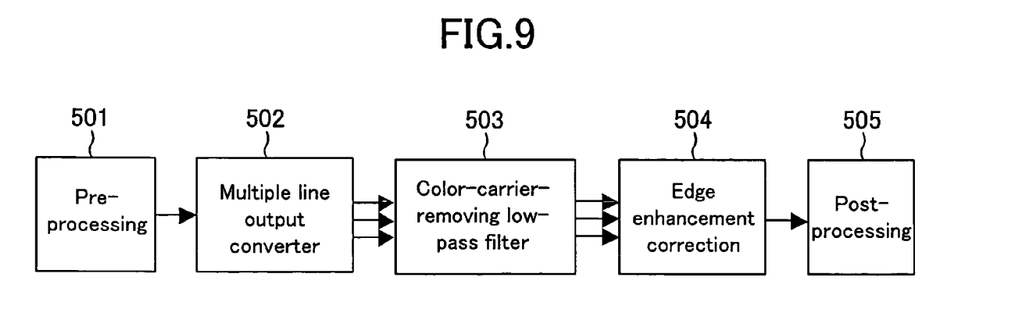
FIG. 9 is a block diagram illustrating the structure of a conventional luminance signal processing device.

This type of imaging device includes a luminance signal processing device which is configured as shown in FIG. 9, for example. In FIG. 9, the reference numeral 501 denotes a preprocessing section for performing black level correction, gamma correction, gain correction and the like for image signal data obtained by subjecting the output of an image sensor having an RGB (red, green and blue) Bayer pattern filter to noise removal process, amplification process, and A/D conversion process. The reference numeral 502 represents a multiple line output converter, which converts the output of the preprocessing section to parallel outputs in which data sets in a plurality of horizontal lines are output in parallel. The reference numeral 503 indicates a low-pass filter, which removes color carrier components, occurring due to the Bayer pattern of the sensor and superposed on the output of the sensor, so as to generate luminance signal data. The reference numeral 504 denotes an edge enhancement correction section, which performs edge enhancement of the luminance signal data by extracting the high-frequency components from the luminance signal data obtained after the color carrier component removal and adding the extracted components to the original luminance signal data. The reference numeral 505 indicates a postprocessing section for adjusting the bias level of the luminance signal data, the gain and the like.

Figure 10:
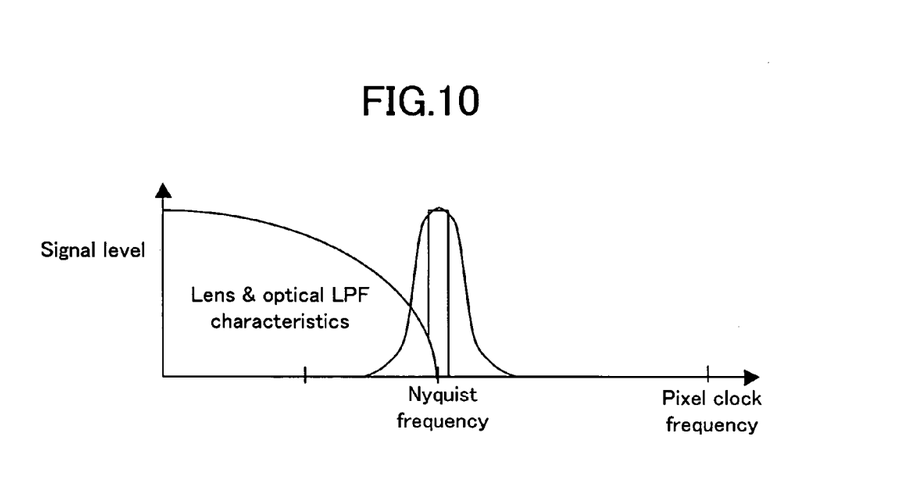
FIG. 10 is a graph indicating exemplary frequency components of the output of a sensor.

FIG. 10 indicates frequency components of the output of the above-described sensor.

In the luminance signal processing device described above, as the first step of the processing, the low-pass filter processing is performed so that the high-frequency color carrier components in the vicinity of the Nyquist frequency are removed to generate the main signals of the luminance signals. By using these signals, the edge enhancement correction is carried out. In this device, the luminance signal processing is performed frame by frame and the characteristics of the low-pass filter 503 for removing the color carrier components are uniform in all portions within the single image area.

Nevertheless, the conventional luminance signal processing device described above has a problem because of the fact that the characteristics of the color-carrier-component-removing low-pass filter 503 are uniform in all portions in the single image area; if the pass-band of the low-pass filter 503 is increased toward the high frequency side in order to increase the resolution in a specific color portion, e.g., a skin color portion, a false edge signal is produced from the remaining color carrier components at a boundary where the colors change greatly in the RGB Bayer pattern, which results in inappropriate edge enhancement.

SUMMARY OF THE INVENTION

In view of the above, it is therefore an object of the present invention to easily achieve both resolution increase in a given color portion and the like and suppression of occurrence of false edge signals at color boundaries.

In order to achieve the object, a first example of the invention is directed to a luminance signal processing device for outputting luminance signal data according to color image signal data based on a sensor signal produced from an image sensor having a Bayer pattern filter including red, green, and blue. The luminance signal processing device includes: a preprocessing section for performing at least black level adjustment, gamma correction, or gain correction for the color image signal data; a multiple line output converter for simultaneously outputting image signal data sets in a plurality of lines in accordance with image signal data output from the preprocessing section; a color carrier component removing/high-frequency level correcting filter section for removing color carrier components and performing high-frequency level correction in accordance with the image signal data sets output from the multiple line output converter; an edge enhancement correction section for performing edge enhancement correction in accordance with image signal data output from the color carrier component removing/high-frequency level correcting filter section; and a detecting section for detecting at least a luminance signal level of a low spatial frequency component, a luminance signal edge level, whether or not a predetermined color is exhibited, a color difference edge level, or whether or not red, green, or blue data reaches a saturation level, in accordance with the image signal data sets output from the multiple line output converter, wherein filter characteristics of the color carrier component removing/high-frequency level correcting filter section are adaptively set for each of pixels or for each of regions containing a plurality of pixels in accordance with results of the detection by the detecting section.

According to a second example of the invention, in the device of the first example, the color carrier component removing/high-frequency level correcting filter section includes a set of filters corresponding to horizontal lines in an image and a set of filters corresponding to vertical lines in the image; each of the filter sets includes a plurality of filters having different frequency characteristics; and the characteristics of the filters in each filter set are combined in accordance with level adaptation coefficients corresponding to the results of the detection performed by the detecting section.

According to a third example of the invention, in the device of the second example, each of the filter sets outputs the total of products, each of which is obtained by multiplying an output of each filter by one of the level adaptation coefficients corresponding to that filter; and the level adaptation coefficients corresponding to the respective filers in each filter set are set so that the sum total of the level adaptation coefficients is 1.

According to a fourth example of the invention, in the device of the second example, each of the filters is a digital filter whose characteristics are established by setting one or more tap coefficients; and the tap coefficients are set so that their sum total in each filter is the same value.

According to a fifth example of the invention, in the device of the first example, the filter characteristics of the color carrier component removing/high-frequency level correcting filter section are set at least for one of the pixels or for one of the regions containing pixels in accordance with the results of the detection performed by the detecting section, the one pixel or the one region being a region in which the luminance signal level of the low spatial frequency component is within a given range, a region in which the luminance signal edge level is within a given range, a region in which the predetermined color is exhibited, a region in which the color difference edge level is within a given range, or a region in which the red, green, or blue data reaches the saturation level.

According to a sixth example of the invention, in the device of the first example, the filter characteristics of the color carrier component removing/high-frequency level correcting filter section are set in accordance with weighted synthesis of at least two of the results of the detection performed by the detecting section, the results including the luminance signal level of the low spatial frequency component, the luminance signal edge level, whether or not the predetermined color is exhibited, the color difference edge level, and whether or not the red, green, or blue data reaches the saturation level.

According to a seventh example of the invention, in the device of the first example, the filter characteristics of the color carrier component removing/high-frequency level correcting filter section are set for a given designated region within a single image area, in accordance with the results of the detection performed by the detecting section.

According to an eighth example of the invention, in the device of the first example, high-frequency characteristics of the color carrier component removing/high-frequency level correcting filter section are set in accordance with the results of the detection performed by the detecting section.

As described above, for example, when RGB Bayer pattern color carrier components are removed from image signal data that is based on a sensor signal containing those color carrier components, luminance signal data is obtained from a mixture of outputs produced from a plurality of dedicated one-dimensional filters having different characteristics and the mixture ratio is adaptively controlled for each pixel. Then, it becomes easy to increase the resolution in a certain color portion and the like and to suppress occurrence of a false edge signal at a color boundary.

DETAILED DESCRIPTION OF THE INVENTION

Hereinafter, the preferred embodiments of the present invention will be described in detail with reference to the accompanying drawings.

Figure 1:
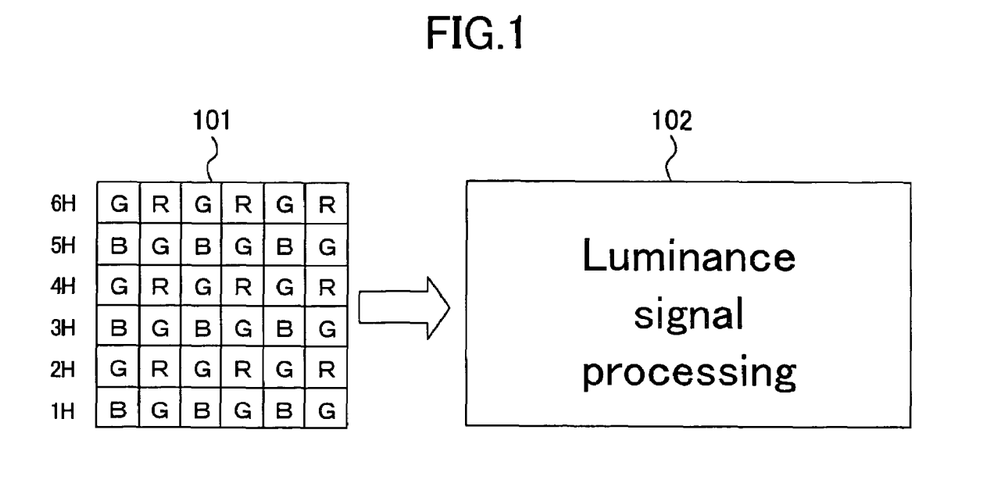
FIG. 1 is an explanatory view illustrating an exemplary color filter according to an embodiment of the present invention.
Figure 2:
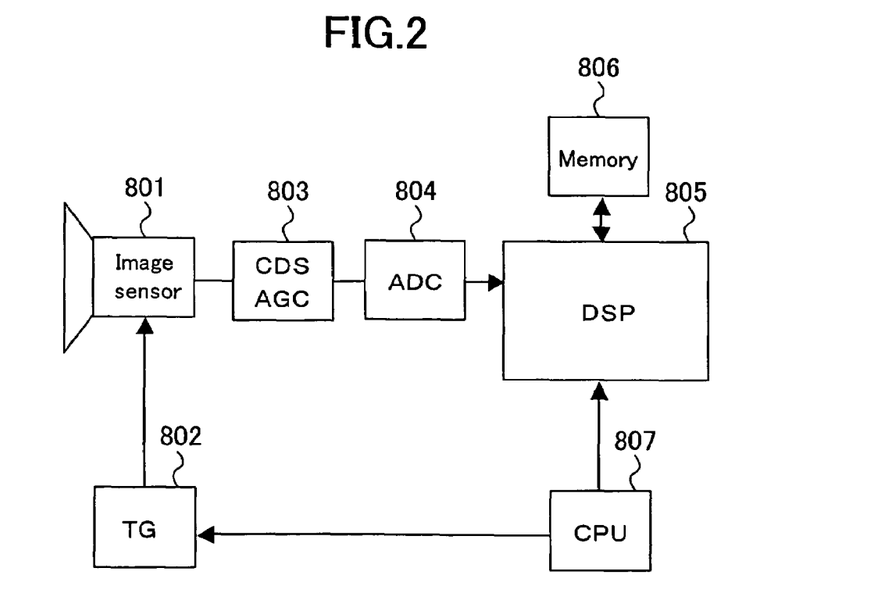
FIG. 2 is a block diagram illustrating the structure of an imaging device to which a luminance signal processing device 102 is applied according to the embodiment of the present invention.

When an image signal is output from an image sensor having a Bayer pattern color filter 101 shown in FIG. 1, a luminance signal processing device 102 produces luminance signal data. A specific example of an imaging device including the luminance signal processing device 102 will be described. As shown in FIG. 2, such a device includes an image sensor 801, a timing generator 802 (TG) for producing driving pulses for the image sensor 801, a CDS/AGC circuit 803 for removing noise from the output of the image sensor 801 and controlling the gain, an analog-digital converter 804 (ADC), a digital signal processing circuit 805 (DSP), a memory circuit 806 for storing image data and various other types of data, and a microcomputer 807 (CPU) for controlling the camera.

Execution of a given program allows the digital signal processing circuit 805 to function as the luminance signal processing device 102. More specifically, the digital signal processing circuit 805 has a functional structure shown in FIG. 3, for example.

Figure 3:
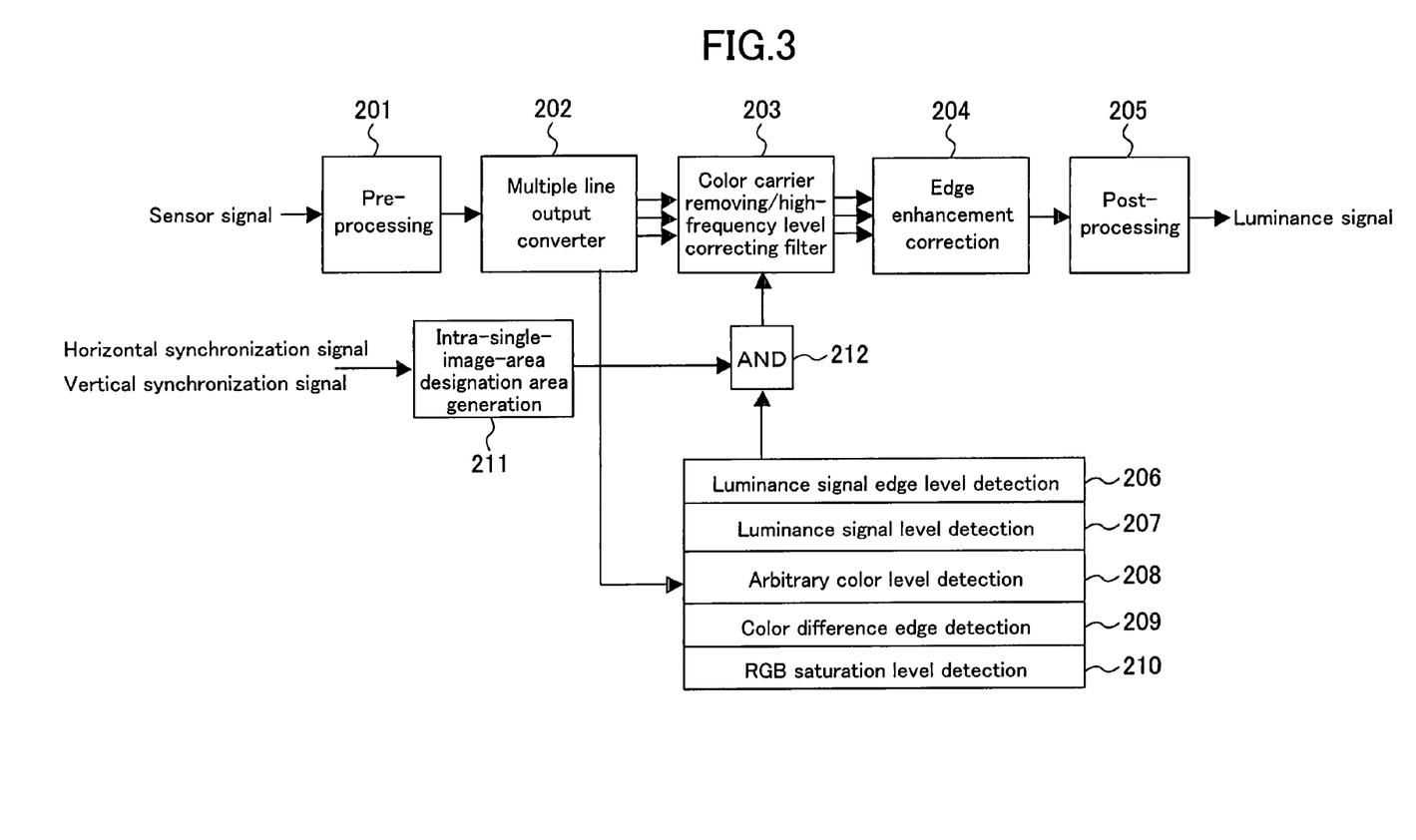
FIG. 3 is a block diagram illustrating the structure of the luminance signal processing device 102 according to the embodiment of the present invention.

A preprocessing section 201 performs black level correction, gamma correction, gain correction and the like for image signal data obtained by analog-to-digital conversion performed by the analog-digital converter 804.

A multiple line output converter 202 converts the image signal data output from the preprocessing section 201 to parallel outputs in which data sets in a plurality of horizontal lines are output in parallel.

A color carrier removing/high-frequency level correcting filter section 203 removes color carrier components, occurring due to the Bayer pattern of the image sensor 801 and superposed on the image signal, and thereby generates luminance signal data. The detailed structure of the color carrier removing/high-frequency level correcting filter section 203 will be discussed later.

An edge enhancement correction section 204 extracts the high-frequency components from the luminance signal data obtained after the color carrier component removal and adds the extracted components to the original luminance signal data, thereby performing edge enhancement of the luminance signal data.

A postprocessing section 205 adjusts the bias level of the luminance data, the gain and the like.

A luminance signal edge level detecting section 206, a luminance signal level detecting section 207, an arbitrary color level detecting section 208, a color difference edge detecting section 209, and an RGB saturation level detecting section 210 detect the luminance signal edge level, the luminance signal level, the level of an arbitrary color (whether or not the color in the detection target pixel or pixel range is a predetermined color that has been set or designated in advance), a color difference signal edge level, and the saturation levels of the RGB signals (whether or not at least one of the red, green and blue signal levels has become saturated), respectively, from the RGB Bayer multiple line outputs produced from the multiple line output converter 202. And according to the detection results, coefficients (band correction coefficients) are generated, which are used to set the color-carrier-removal high-frequency level correction characteristics of the color carrier removing/high-frequency level correcting filter section 203. The detections described above are performed for each pixel or each region including a plurality of pixels, for example. In this embodiment, as describe above, the RGB Bayer multiple line outputs produced from the multiple line output converter 202 and the signals output to the color carrier removing/high-frequency level correcting filter section 203 are output at different times but their contents are the same. Also, the luminance extraction by the luminance signal level detecting section 207 and the like is different from the luminance extraction by the color carrier removing/high-frequency level correcting filter section 203 and is performed, for example, within those detecting sections by a simple method.

In response to a designation signal (not shown), an intra-single-image-area designation area generating section 211 outputs effective-range signals that indicate, for each pixel or each given region, whether or not to validate the settings, by the respective detecting sections 206 to 210, of the coefficients for the color carrier removing/high-frequency level correcting filter section 203.

According to the effective range signals, an overall band correction coefficient generating circuit 212 combines the detection results output from the detecting sections 206 to 210 in accordance with the average of the detection results, the weighted addition (average) of the detection results, selection made from the detection results in a certain order of precedence, selection made from the detection results depending upon whether each detection result satisfies a given condition, or the like, and then outputs an overall band correction coefficient α for each pixel or each region containing a plurality of pixels to the color carrier removing/high-frequency level correcting filter section 203. The overall band correction coefficient α is, e.g., a value equal to or smaller than 1, and the same value is used for each pixel (or each region containing pixels) when filter processing is performed in the horizontal and vertical directions.

Figure 4:
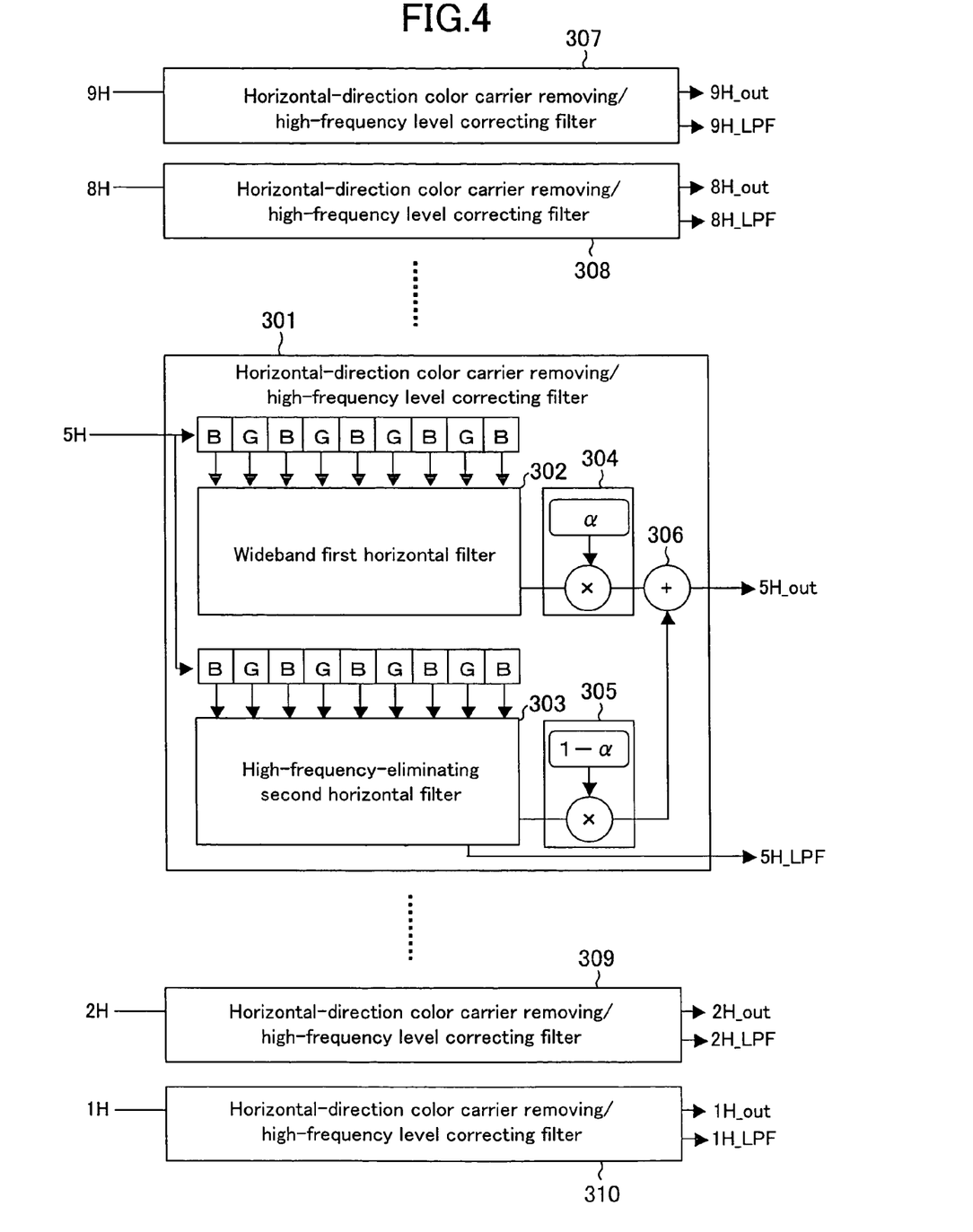
FIG. 4 is a block diagram illustrating the specific structure of a part of a color carrier removing/high-frequency level correcting filter section 203 according to the embodiment of the present invention.
Figure 5:
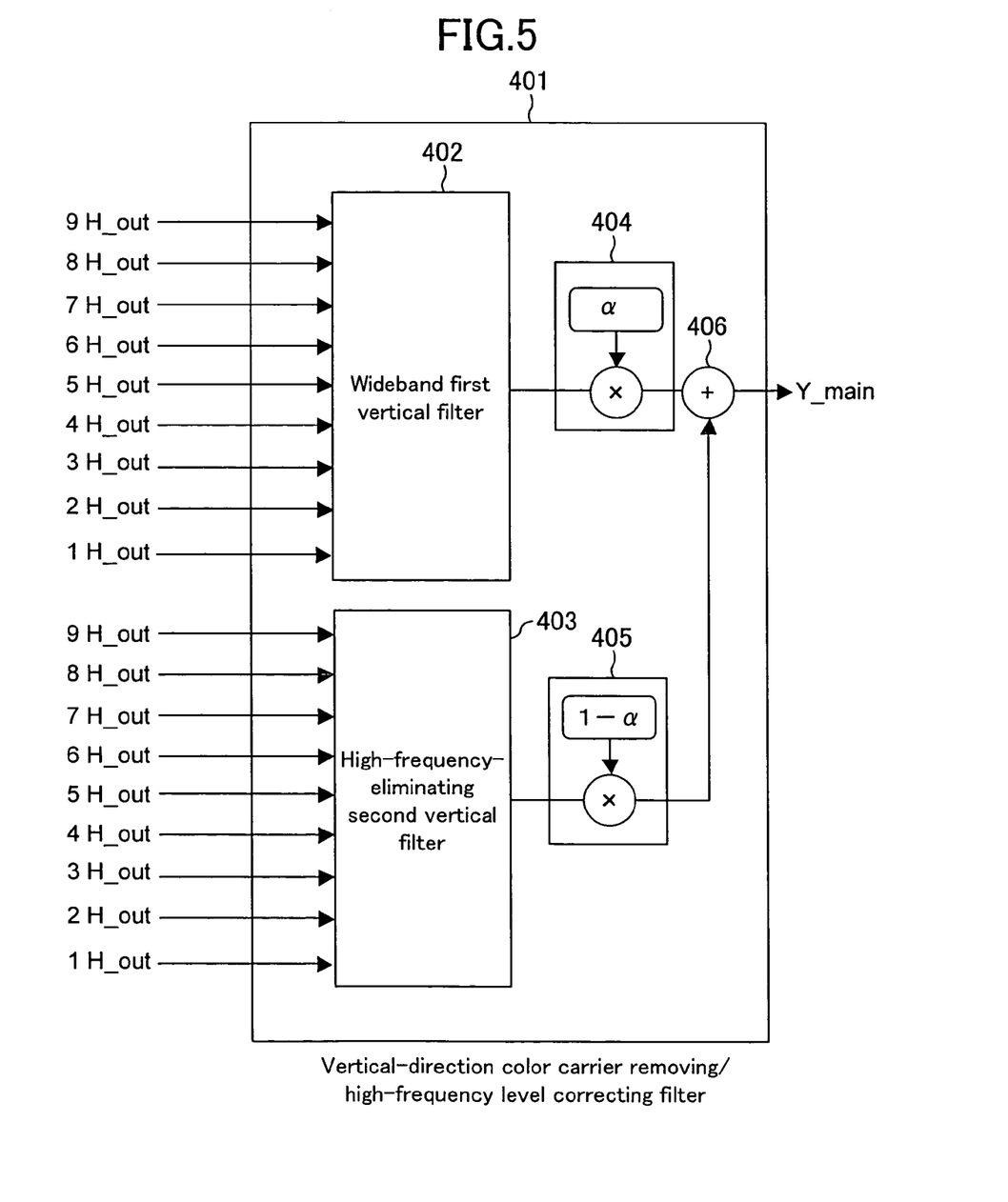
FIG. 5 is a block diagram illustrating the specific structure of another part of the color carrier removing/high-frequency level correcting filter section 203 according to the embodiment of the present invention.

More specifically, the color carrier removing/high-frequency level correcting filter section 203 is structured as shown in FIGS. 4 and 5, for example.

That is, the color carrier removing/high-frequency level correcting filter section 203 includes horizontal-direction color carrier removing/high-frequency level correcting filters 301, 307 to 310 and the like and a vertical-direction color carrier removing/high-frequency level correcting filter 401. The horizontal-direction color carrier removing/high-frequency level correcting filters 301, 307 to 310 and the like each perform processing for pixels in the horizontal direction (i.e., processing for removing color carriers and correcting the high-frequency level for the RGB Bayer pattern signals in one line in the horizontal direction). The vertical-direction color carrier removing/high-frequency level correcting filter 401 performs processing for pixels in the vertical direction (i.e., processing for removing vertical color carriers and correcting the high-frequency level for the RGB Bayer pattern signals in multiple lines from which the horizontal color carriers have been removed).

As shown in the horizontal-direction color carrier removing/high-frequency level correcting filter 301 as the representative example, each of the horizontal-direction color carrier removing/high-frequency level correcting filters 301 and 307 to 310 includes a first horizontal filter 302, a second horizontal filter 303, a multiplier 304, a multiplier 305, and an adder 306. The first horizontal filter 302 is a wideband low-pass filter whose tap number is nine, for example. The second horizontal filter 303 is a low-pass filter for eliminating the high-frequency range. The multiplier 304 multiplies the output of the first horizontal filter 302 by the overall band correction coefficient α. The multiplier 305 multiplies the output of the second horizontal filter 303 by the coefficient 1-α. The adder 306 combines (adds) the outputs of the respective multipliers 304 and 305.

Also, the vertical-direction color carrier removing/high-frequency level correcting filter 401 includes a first vertical filter 402, a second vertical filter 403, a multiplier 404, a multiplier 405, and an adder 406. The first vertical filter 402 is a wideband low-pass filter. The second vertical filter 403 is a low-pass filter for eliminating the high-frequency range. The multiplier 404 multiplies the output of the first vertical filter 402 by the overall band correction coefficient α. The multiplier 405 multiplies the output of the second vertical filter 403 by the coefficient 1-α. The adder 406 combines (adds) the outputs of the respective multipliers 404 and 405 and outputs luminance signal data Y_main. The outputs 1H_out to 9H_out from the respective adders 306 in the horizontal-direction color carrier removing/high-frequency level correcting filter 301 and the like are input to both the first vertical filter 402 and the second vertical filter 403.

Figure 6:
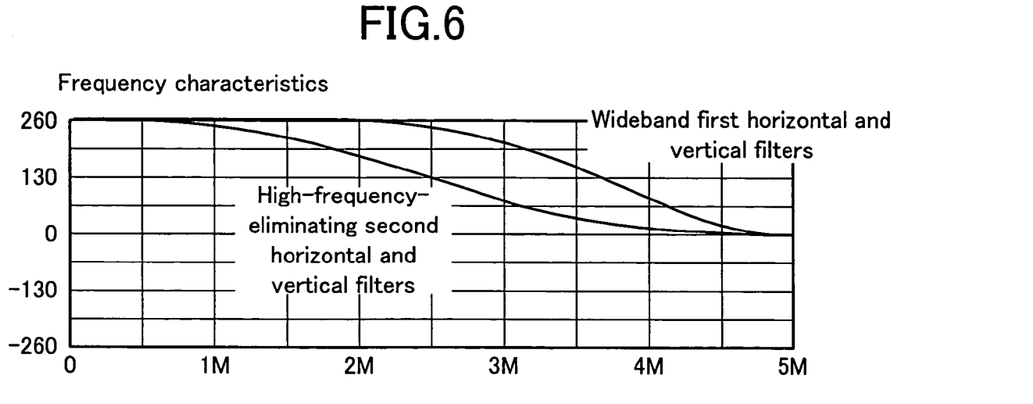
FIG. 6 is a graph illustrating the frequency characteristics of filters according to the embodiment of the present invention.

As the first horizontal filter 302, the second horizontal filter 303, the first vertical filter 402, and the second vertical filter 403, digital filters with nine taps, for example, are used, and by setting certain tap coefficients, they have frequency characteristics shown in FIG. 6, for example. In this embodiment, the tap coefficients are established so that their sum total in each filter is the same value. By setting the tap coefficients in this manner, the levels of output DC components with respect to the same input DC component are equal to each other, whereby the overall band correction coefficient α and the value 1-α can be set easily and the frequency characteristics in the horizontal and vertical directions can be easily made uniform.

Now, a description will be made of operation of the imaging device including the luminance signal processing device 102 thus structured.

First, when incident light enters the image sensor 801 through a lens (not shown), the light is converted into electric signals by photodiodes and the like and an image signal, which is an analog continuous signal, is output from the image sensor 801 by vertical drive and horizontal drive that are synchronous with the driving pulses produced from the timing generator 802. The output image signal, after its 1/f noise is appropriately reduced by a sample hold circuit (CDS) in the CDS/AGC circuit 803, is subjected to automatic gain control and then input into the analog-digital converter 804 (the A/D converter), where the signal is converted into image signal data (RGB data), which is digital signals. The converted image signal data is input into the digital signal processing circuit 805 and then subjected to various kinds of processing, such as luminance signal processing, color separation, and color matrix processing, by way of the memory circuit 806.

To be specific, the luminance signal processing is performed as follows. In the case where the color filter pattern in the image sensor 801 is the RGB Bayer pattern, the image signal data taken into the digital signal processing circuit 805 is subjected to black level adjustment, gamma adjustment and color gain adjustment in the preprocessing performed by the preprocessing section 201. Thereafter, the output order is changed in the multiple line output converter 202 by using a line memory or a working memory, and the image signal data sets for the pixels in a plurality of horizontal lines are sequentially output in parallel.

The output of the multiple line output converter 202 is input into the color carrier removing/high-frequency level correcting filter section 203 with the Bayer pattern information being maintained. In the color carrier removing/high-frequency level correcting filter section 203, components that are in the vicinity of the Nyquist frequency and contain color carriers are removed to generate the main signals of the luminance signals in the plurality of lines.

When the color carrier removing/high-frequency level correcting filter section 203 performs the processing for removing the color carrier components occurring due to the Bayer pattern of the image sensor 801 and superposed on the image signal, the overall band correction coefficient $\alpha$ for the horizontal-direction color carrier removing/high-frequency level correcting filters 301 and 307 to 310 and the vertical-direction color carrier removing/high-frequency level correcting filter 401 is set in the following manner in accordance with the results of the detections performed by the detecting sections 206 to 210 for each pixel or for each given region, and then band control (control of filter characteristics) is performed.

More specifically, the luminance signal edge level detecting section 206 detects the luminance signal's edge level due to random noise in the vicinity of the Nyquist frequency. And the higher the detected level is, the smaller the band correction coefficient is set, so that the band is controlled so as to decrease the high-frequency component level. Then, a strong edge signal occurring due to scratches and the like on the image sensor 801 is suppressed, whereby the scratch correction can be controlled to increase the S/N.

Also, the luminance signal level detecting section 207 detects the luminance signal level. And the lower the detected level is, the smaller the band correction coefficient is set for control of the band. Then, it becomes possible to suppress noise in low light intensity portions that is in the frequency range lower than the vicinity of the Nyquist frequency, thereby increasing the S/N.

Furthermore, the arbitrary color level detecting section 208 detects an arbitrary color level. And as the level of focus pixel data approaches to the arbitrary color level (i.e., when the focus pixel color is the predetermined color, or as the focus pixel color approaches to the predetermined color), the band correction coefficient is set smaller for control of the band. Then, as a blue sky color, a human skin color or the like approaches to data arbitrarily set in advance, noises in the frequency range lower than the vicinity of the Nyquist frequency can be suppressed more strongly to increase the S/N.

Also, the color difference edge detecting section 209 detects the edge level of a color difference signal. And the higher the detected edge level is, the smaller the band correction coefficient is set, whereby the band is controlled in such a manner that noise in the frequency range lower than the vicinity of the Nyquist frequency is suppressed. This minimizes influence of a high-frequency false signal occurring at a color boundary portion, thereby increasing the S/N.

Moreover, the RGB saturation level detecting section 210 detects the saturation levels of the RGB signals. By the detection of the saturation levels of the three kinds of signals (when at least one of the signal levels of the red, green, and blue reaches the saturation), the band correction coefficient is set small, whereby the band is controlled in such a manner that noise in the frequency range lower than the vicinity of the Nyquist frequency is suppressed. This reduces graininess caused by variations in saturation level in the CCD sensor and the like, thereby increasing the S/N.

In this embodiment, all of the detection operations by the detecting sections 206 to 210 do not necessarily have to performed, and one or more of those detection operations may be carried out.

In the overall band correction coefficient generating circuit 212, the overall band correction coefficient $\alpha$ is generated in accordance with the detection results produced from the detecting sections 206 to 210. When a setting-validated area is designated by the intra-single-image-area designation area generating section 211, the overall band correction coefficient $\alpha$ is passed through the overall band correction coefficient generating circuit 212 so as to be output and actually set in the color carrier removing/high-frequency level correcting filter section 203 only for the pixel or the area corresponding to that designation. This enables the above-described luminance signal processing to be performed for each scene whose image is to be taken, for each area, or the like. Specifically, in taking an image in which the depth of field is shallow, the portion other than an automatically focused area may be specified as the designation area.

After the overall band correction coefficient $\alpha$ is set, the horizontal-direction color carrier removing/high-frequency level correcting filters 301 and 307 to 310 in the color carrier removing/high-frequency level correcting filter section 203 output 1H_out to 9H_out, each of which is the sum total of two values: the value obtained by multiplying the output of the first horizontal filter 302 by the overall band correction coefficient $\alpha$ and the value obtained by multiplying the output of the second horizontal filter 303 by 1-$\alpha$. The outputs of the first and second horizontal filters 302 and 303 are based on a corresponding one of the image data sets 1H to 9H in the horizontal lines. Likewise, the luminance signal data Y_main is also output as the sum total of two values: the value obtained by multiplying the output of the first vertical filter 402 by the overall band correction coefficient $\alpha$ and the value obtained by multiplying the output of the second vertical filter 403 by 1-$\alpha$. The outputs of the first and second vertical filters 402 and 403 are based on the outputs 1H_out to 9H_out. More specifically, in the example shown in FIGS. 4 and 5, the luminance signal data Y_main for each pixel in the fifth line is output consecutively. For the other lines, the image data for a neighboring line is input into the horizontal-direction color carrier removing/high-frequency level correcting filter 301 and the like and the luminance signal data Y_main is likewise output consecutively.

Thereafter, the edge enhancement correction section 204 extracts the high-frequency components from the luminance signals in the multiple lines from which the color carrier components have already been removed and adds the extracted components to the original luminance signal data, thereby performing edge enhancement of the luminance signals. Furthermore, the postprocessing section 205 adjusts the bias level of the luminance signals, the gain and the like so as to optimize the output levels of the luminance signals within the 8-bit range.

According to the luminance signal processing method of the present invention, from a sensor signal that contains RGB Bayer pattern color carrier components, the color carriers are effectively removed pixel by pixel or the like, while the signal band is set and controlled for each pixel or the like. This allows the following effects to be achieved easily. A strong edge signal that contains information on a scratch on the sensor is suppressed; the S/N is improved by reducing the high-frequency components in low light intensity portions; the S/N is improved by freely setting a blue sky color, a skin color and the like; occurrence of a false edge signal at a color boundary is suppressed for each pixel; graininess caused by variations in saturation level in the sensor is suppressed; and the resolution in certain color portions can be increased up to the limit.

Also, noise reduction is performed for the signal output from the sensor data in correlation with the luminance level, whereby random noise in the CCD data and the like is suppressed while the high-frequency components necessary for the edge enhancement and the like are not reduced too much by the uniform low-pass filters in the first stage, thereby securing the high-frequency information in the signal.

It should be noted that although the number of taps in the horizontal-direction color carrier removing/high-frequency level correcting filter 301 and the like is nine in the exemplary case described in this embodiment, the number of taps is not limited to this.

Moreover, in the exemplary case, the horizontal-direction color carrier removing/high-frequency level correcting filter 301 and the like each include two filters, such as the first horizontal filter 302 and the second horizontal filter 303. The present invention, however, is not limited to this, but more filters may be used. More specifically, a plurality of overall band correction coefficients, the total of which is 1, for example, may be output from the overall band correction coefficient generating circuit 212 and the filter characteristics may be controlled by multiplying the output of each filter by a corresponding one of the overall band correction coefficients and then by summing the respective multiplication results together.

Figure 7:
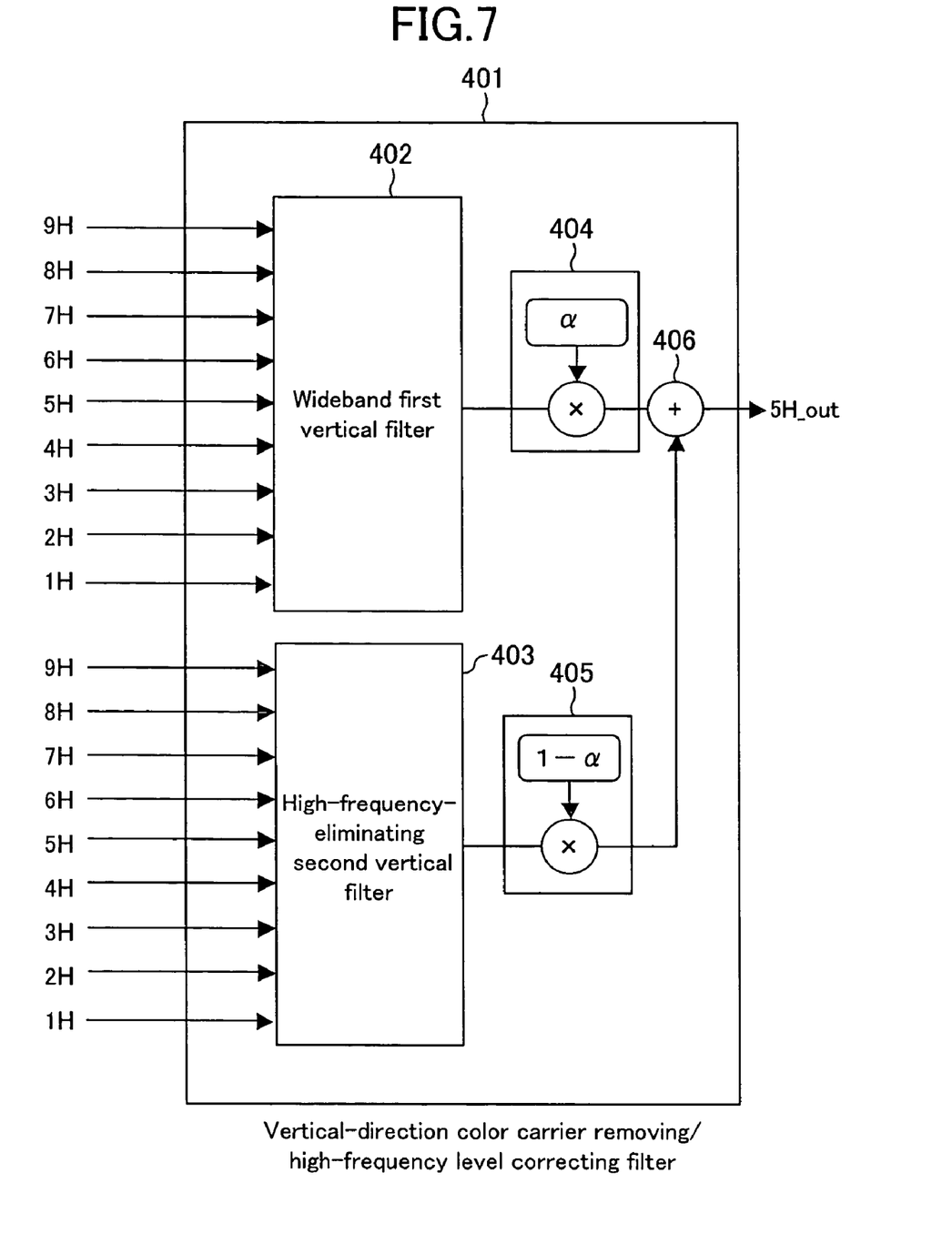
FIG. 7 is a block diagram illustrating the specific structure of a part of a color carrier removing/high-frequency level correcting filter section according to a modified example.
Figure 8:
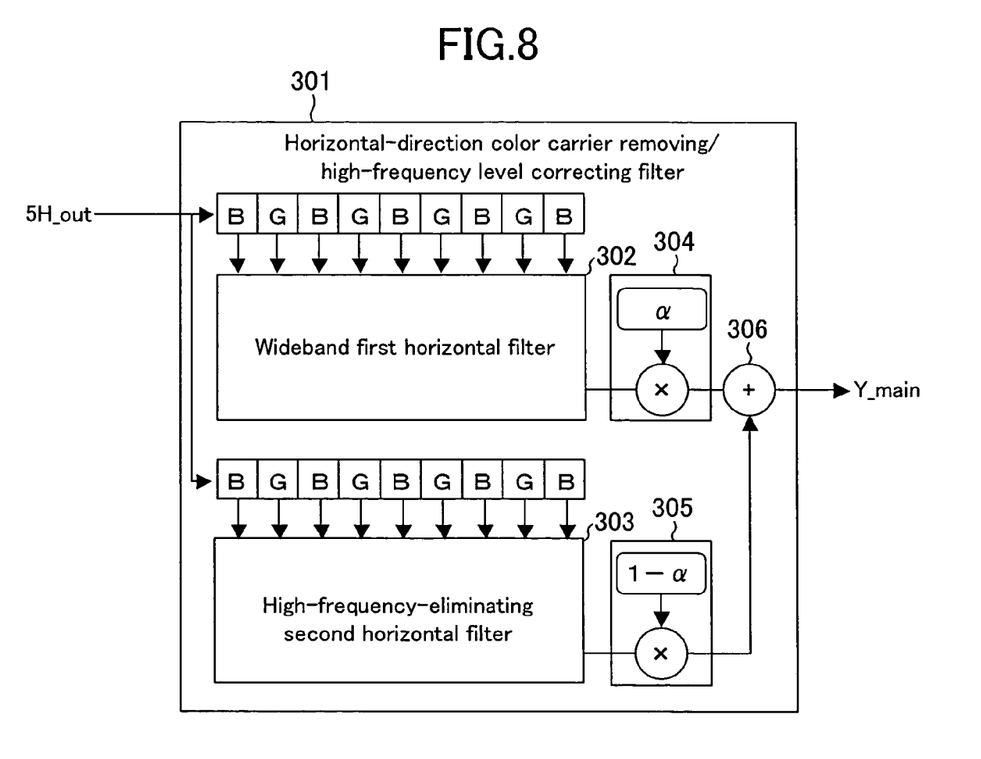
FIG. 8 is a block diagram illustrating the specific structure of another part of the color carrier removing/high-frequency level correcting filter section according to the modified example.

Furthermore, in the exemplary case described above, after the horizontal-direction color carrier removing/high-frequency level correcting filter 301 (shown in FIG. 4) performs the horizontal filter processing, the vertical-direction color carrier removing/high-frequency level correcting filter 401 (shown in FIG. 5) performs the vertical filter processing. Nevertheless, the present invention is not limited to this. For instance, as shown in FIGS. 7 and 8, the image data sets 1H to 9H in the respective lines output from the multiple line output converter 202 may be input into the vertical-direction color carrier removing/high-frequency level correcting filter 401. In this case, the vertical filter processing result 5H_out for each pixel in the fifth line is sequentially output from the vertical-direction color carrier removing/high-frequency level correcting filter 401 and then input into the single horizontal-direction color carrier removing/high-frequency level correcting filter 301. In the horizontal-direction color carrier removing/high-frequency level correcting filter 301, the input vertical filter processing result 5H_out is subjected to the horizontal filter processing, thereby outputting the luminance signal data Y_main.

As described above, from image signal data based on a sensor signal containing RGB Bayer pattern color carrier components, for example, the color carrier components are effectively removed pixel by pixel, while occurrence of a false edge signal at a color boundary, which is caused by increase in the signal band, is suppressed for each pixel. As a result, it becomes easy to significantly increase the resolution in a certain color portion and the like. In addition, the band of the luminance signal can be set in accordance with whether the corresponding pixel or image area is a low light intensity portion, whether the corresponding pixel or image area is a single color portion, whether a signal in the corresponding pixel or image area reaches the sensor's saturation level, and the like, and the signal's S/N can be optimally controlled within the single image area.

What is claimed is:

1. A luminance signal processing device for outputting luminance signal data according to color image signal data based on a sensor signal produced from an image sensor having a Bayer pattern filter including red, green, and blue, the device comprising:

a preprocessing section for performing at least black level adjustment, gamma correction, or gain correction for the color image signal data;

a multiple line output converter for simultaneously outputting image signal data sets in a plurality of lines in accordance with image signal data output from the preprocessing section;

a color carrier component removing/high-frequency level correcting filter section for removing color carrier components and performing high-frequency level correction in accordance with the image signal data sets output from the multiple line output converter;

an edge enhancement correction section for performing edge enhancement correction in accordance with image signal data output from the color carrier component removing/high-frequency level correcting filter section; and a detecting section for detecting at least a luminance signal level of a low spatial frequency component, a luminance signal edge level, whether or not a predetermined color is exhibited, a color difference edge level, or whether or not red, green, or blue data reaches a saturation level, in accordance with the image signal data sets output from the multiple line output converter, wherein filter characteristics of the color carrier component removing/high-frequency level correcting filter section are adaptively set for each of pixels or for each of regions containing a plurality of pixels in accordance with results of the detection by the detecting section.

2. The device of claim 1, wherein the color carrier component removing/high-frequency level correcting filter section includes a set of filters corresponding to horizontal lines in an image and a set of filters corresponding to vertical lines in the image;

each of the filter sets includes a plurality of filters having different frequency characteristics; and the characteristics of the filters in each filter set are combined in accordance with level adaptation coefficients corresponding to the results of the detection performed by the detecting section.

3. The device of claim 2, wherein each of the filter sets outputs the total of products, each of which is obtained by multiplying an output of each filter by one of the level adaptation coefficients corresponding to that filter; and the level adaptation coefficients corresponding to the respective filers in each filter set are set so that the sum total of the level adaptation coefficients is 1.

4. The device of claim 2, wherein each of the filters is a digital filter whose characteristics are established by setting one or more tap coefficients; and the tap coefficients are set so that their sum total in each filter is the same value.

5. The device of claim 1, wherein the filter characteristics of the color carrier component removing/high-frequency level correcting filter section are set at least for one of the pixels or for one of the regions containing pixels in accordance with the results of the detection performed by the detecting section, the one pixel or the one region being a region in which the luminance signal level of the low spatial frequency component is within a given range, a region in which the luminance signal edge level is within a given range, a region in which the predetermined color is exhibited, a region in which the color difference edge level is within a given range, or a region in which the red, green, or blue data reaches the saturation level.

6. The device of claim 1, wherein the filter characteristics of the color carrier component removing/high-frequency level correcting filter section are set in accordance with weighted synthesis of at least two of the results of the detection performed by the detecting section, the results including the luminance signal level of the low spatial frequency component, the luminance signal edge level, whether or not the predetermined color is exhibited, the color difference edge level, and whether or not the red, green, or blue data reaches the saturation level.

7. The device of claim 1, wherein the filter characteristics of the color carrier component removing/high-frequency level correcting filter section are set for a given designated region within a single image area, in accordance with the results of the detection performed by the detecting section.

8. The device of claim 1, wherein high-frequency characteristics of the color carrier component removing/high-frequency level correcting filter section are set in accordance with the results of the detection performed by the detecting section.

* * * * *